United States Patent [19]
Kohls

[11] 3,854,641
[45] Dec. 17, 1974

[54] ARTICLE CARRIER FOR RECREATIONAL VEHICLES

[76] Inventor: Richard S. Kohls, 802 N.E. Ravenna Blvd., Seattle, Wash. 98115

[22] Filed: Feb. 27, 1973

[21] Appl. No.: 336,327

[52] U.S. Cl. .......................... 224/29 R, 211/60 SK
[51] Int. Cl. ............................................... B60r 9/00
[58] Field of Search....... 224/42.1 F, 29 R, 42.03 R, 224/42.03 A, 42.03 B, 42.07, 42.08, 42.33, 42.46; 214/450; 211/60 SK, 99, 100

[56] References Cited
UNITED STATES PATENTS

| | | | |
|---|---|---|---|
| 2,663,474 | 12/1953 | Kelly................................... | 214/450 |
| 2,919,058 | 12/1959 | Thompson ......................... | 224/29 R |
| 3,348,747 | 10/1967 | Vuarchex ........................ | 224/42.1 F |
| 3,695,495 | 10/1972 | Parsons............................. | 224/29 R |

Primary Examiner—Robert G. Sheridan
Assistant Examiner—John Mannix
Attorney, Agent, or Firm—Seed, Berry, Vernon & Baynham

[57] ABSTRACT

Ski and ski pole carrier means for expedient and reliable use on an upstanding supporting surface for example, a rear end surface or, alternatively, available side surfaces of a camper, a van, or a similar recreational vehicle and characterized by (1) an upper racking, clamping and suspending section and (2) a companion lower section. These two sections are oriented one above the other, are hingedly bracketed in coordinating relationship and each rack or section is equipped with an outwardly positioned extensible and retractable frame unit. The upper frame unit accommodates and clampingly suspends the skis and ski poles. The lower frame unit embodies structurally and functionally unique means for seating, stabilizing and preventing displacement of the associated lower end portions of the clampingly suspended skis.

6 Claims, 4 Drawing Figures

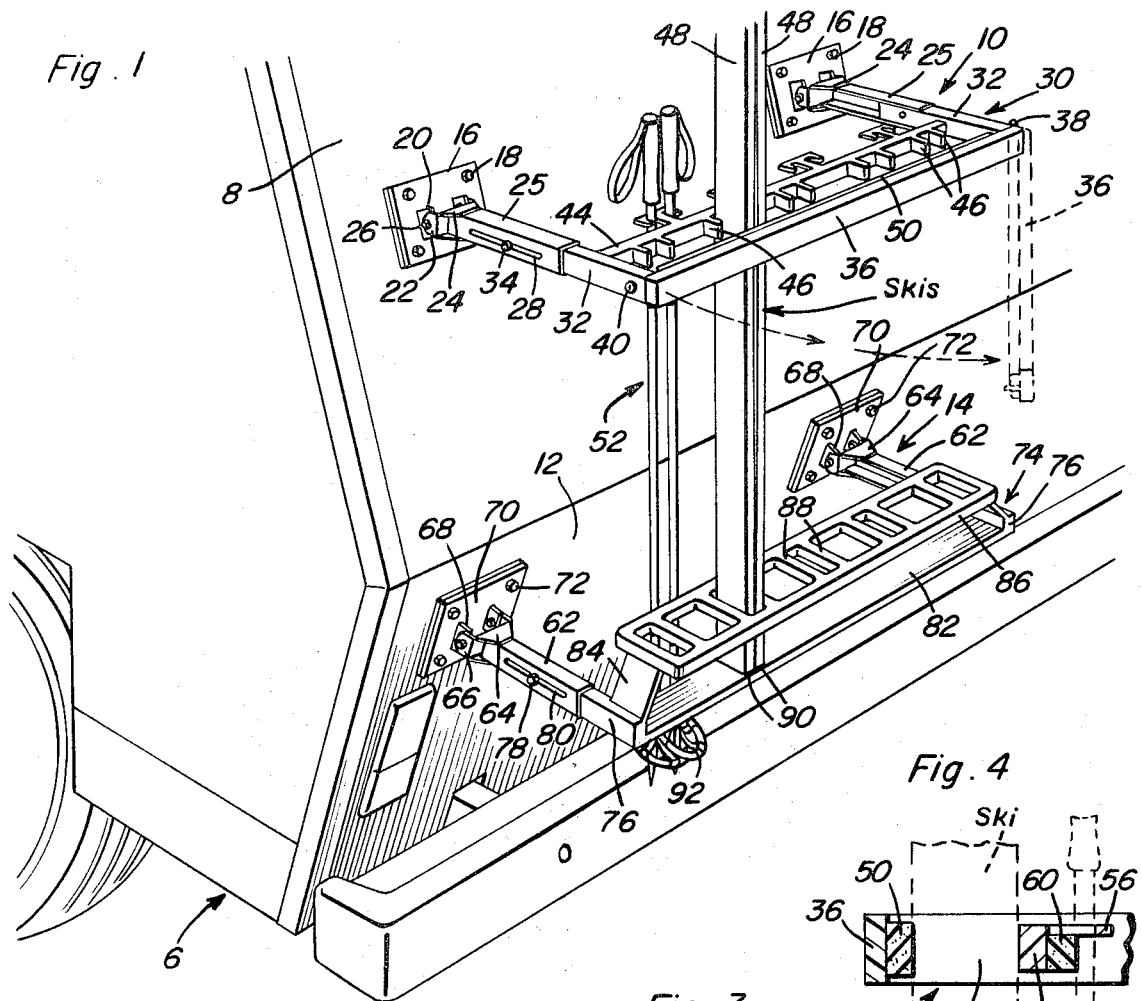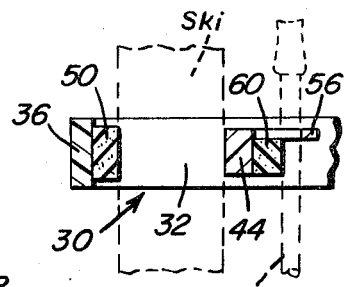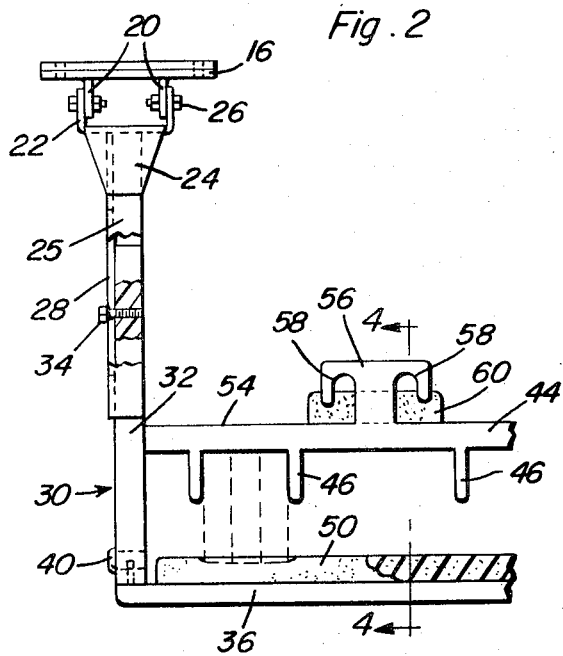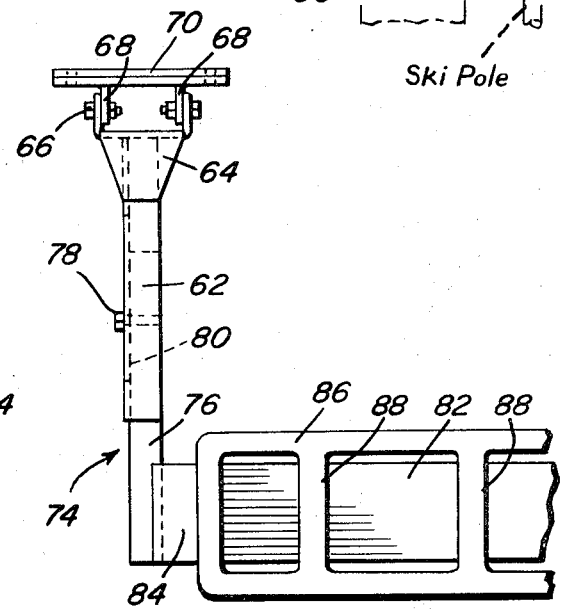

ARTICLE CARRIER FOR RECREATIONAL VEHICLES

This invention relates to certain new and useful improvements in article holding and transporting carriers and has to do, more particularly, with upper and lower rack sections which are expressly designed and adapted for practical use on substantially upright rear end or side surfaces of campers, vans, or similar recreational vehicles, and wherein each rack or section is hingedly mounted and embodies an extensible and retractable frame unit having unique facilities to clampingly hold and safely transport skis and ski poles.

More specifically, the concept comprehends individual but complemental ski and ski pole racking sections which lend themselves to bracketed installation on coordinating vertical mounting areas of recreational vehicles and vans where the available mounting areas are not in a common plane and wherein clearance and spacing difficulties, between the skis and ski poles, are encountered and also wherein this problem appears not to have satisfactorily been solved by similarly performing prior art ski racks and carriers.

An aspect of the instant disclosure has to do with the adoption and use of component parts which can be successfully and acceptably made of fiber glass or equivalent moldable plastic materials, and, in so doing, to achieve attractive and colorful appearance and to conform with the color or colors of the vehicle. Then, too, the usage of plastic materials insures not only economical production aims but promotes acceptable servicing and maintenance.

There has long existed a need for ski and ski pole carriers which lend themselves to feasible and reliable use on campers, vans and recreational vehicles such as are susceptible of serviceable use in safely transporting skis and ski poles to and from the recreational area. Persons conversant with this field of endeavor are aware that many and varied ski racks and carriers have been devised and recommended for use and wherein, generally stated, the structures are such as to be serviceable only on trunk lids and top and end portions of automobiles. Reference may be made to the combination ski rack and luggage carrier which is adapted to be mounted on a trunk lid of an automobile by variably positionable hinge means and which is disclosed in Pat. No. 3,610,491 granted to John A. Bott. Another adaptation along similar lines and which has to do with spaced rack sections and anchoring means is shown in a trunk lid rack, Pat. No. 3,606,111 granted to Donald J. Gjesdahl. Then, too, and because it provides for vertical support of paired skis and ski poles attention is directed to the lockable device shown in Pat. No. 3,604,228, granted to John P. Conlon. These several patents will be found to be exemplary, generally stated, of the art to which the present invention relates.

Briefly the improved carrier herein under consideration relates to dual rack carrier means for use on a vertical supporting surface, that is, a rear end surface or, alternatively, substantially vertical side surfaces and wherein said means is characterized by an upper ski and ski pole racking, clamping and suspending section, namely, a section embodying means which is designed and adapted to be accessibly positioned and adjustably bracketed in an upstanding serviceable position on an upper area of the selected supporting surface. The complemental lower section is designed and adapted to be accessibly located and adjustably bracketed on a lower area of the stated supporting surface in a plane below and cooperatively aligned with the upper rack or section and both sections are provided with self-contained facilities to accommodate the end portions of the skis and ski poles.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective showing a rear end of a recreational vehicle with unaligned upper and lower portions and, what is more significant, showing the overall carrier and how it is constructed and aptly and satisfactorily used.

FIG. 2 is a fragmentary view with parts in section and elevation detailing one end portion of the upper section or rack.

FIG. 3 is a plan view of the left hand end portion of the lower rack or section.

FIG. 4 is a detail section taken approximately on the plane of the section line 4—4 of FIG. 2 looking in the direction of the indicating arrows.

The upper inclined rear end wall portion of the vehicle 6 is denoted in FIG. 1 at 8 and it is on this area or surface that the upper rack or section is mounted, the overall section being denoted by the numeral 10. The offset and inclined surface portion 12 is utilized in this arrangement to accommodatingly support the lower rack or section 14.

Duplicate paired and aligned bracket means is employed in conjunction with the upper rack or section 1. A description of one means will suffice for both. To this end it will be noted that the rectangular or equivalent base plate is denoted at 16 and is superimposed on the surface 8 at the point shown and is secured in place by appropriate fasteners here designated at 18. The rear surface of the plate is provided with paired outstanding lugs 20 to accommodate coordinating or lateral ears 22 on an attaching and hinging bracket 24. The hinging means is denoted at 26 and in practice may comprise insertable bolts which serve not only as pivots but as attaching and retaining members for the bracket 24. The bracket 24 is provided with a companion channel-shaped member 25 which is open along one side and provided along the other web side with a slot 28. The bracket 24 and channel 25 may be interpreted as adapter means. This bracketing and adapter means serves to accommodatingly support a component part of the overall section which is here designated as a frame unit 30. This frame unit embodies arms 32 which are disposed in spaced parallelism and are coplanar and have end portions extending into the channels of the channel members, being secured therein by fasteners 34 to thus provide the desired extensible and retractable feature. A clamping and retaining arm is denoted at 36 and spans the outer end portions of the arms 32 being hinged in place at one end as at 38. The other end is constructed as shown in dotted lines in FIG. 2 to accommodate a key operated lock 40 (not detailed). A brace 44 is secured at its ends to the intermediate portions of the arms 32 and spans the space in parallel relationship to the hinged arm 32. The outer surface of this brace is provided with paired guides 46 which are arranged to accommodatingly support portions of the paired skis 48. The skis are clamped between the guides and brace by way of an elongated neoprene strip 50. Thus when the arm is closed and locked the skis are bound between the guides and also between the arm 36 and the cross brace 44 as brought out with particularity in FIG. 1.

The brace 44 accommodates not only the skis but also the companion applicable and removable ski poles here designated at 52. Each ski pole holder is the same in construction and a description of one will suffice for all and in this connection attention is invited to FIG. 2 wherein it will be seen that the inward vertical side 54 of the brace 44 is provided with an integral substantially T-shaped ski pole holder 56. The crosshead thereof is provided with suitable seating notches or keepers 58 for cooperating portions of the ski poles in the manner brought out for example in FIG. 1. In addition to the T-shaped keepers each holder comprises a suitably proportioned and secured block of neoprene 60 which is so arranged as to bridge the keeper seats and in this manner to not only seat the rods but to bind the same in place so that they hang down toward and cooperate with the aforementioned lower rack or section 14. Thus the rack or section 10 serves to accommodatingly clamp and suspend the skis and ski poles. The rack or section 14 is basically the same as the section 10 in that certain of the component parts are duplicated. This is to say each channel-shaped member or adapter is denoted at 62 and is equipped at an attachable end with a companion bracket 64 having ears 66 overlapping and bolted and hinged to outstanding lugs 68 on a face of the base plate 70. The base plate is superimposed on the surface 12 and fastened in place as at 72. In this arrangement the projectable and retractable frame unit is denoted at 74 and it too embodies a pair of coplanar spaced parallel arms 76 which are slidable into the respective channel adapters and provided with fastening means 78 cooperable with the slot means 80. The arms in this instance are connected with a ledge-type shelf 82 provided at its ends with uprights 84 carrying an elongated horizontal frame 86 which in turn is provided with spaced bars 88 which serve to secure the lower end portions 90 of the skis. By thus positioning the frame 86 directly above and spaced in alignment with the ledge the component parts cooperate in seating and securely maintaining the skis in set and transporting position. The lower basket-equipped ends 92 of the ski poles can be maintained between the wall 12 and shelf 82 in the manner illustrated.

All of the primary component parts of the upper and lower racks or sections are susceptible of being economically and expeditiously produced from suitable plastic materials including, as is generally the case, fiber glass.

This transporting and retaining carrier while capable of accommodating articles other than those shown is preferably, but not necessarily, designed and adapted to accommodatingly handle readily accessible skis and ski poles. By utilizing sections 10 and 14 and constructing the same of the component parts shown and described it will be evident that the overall carrier lends itself to use on upstanding or substantially vertical support surfaces on the aforementioned recreational vehicles.

A careful consideration of the views of the drawing in conjunction with the description will enable the reader to obtain, it is believed, a clear and comprehensive understanding of the features and advantages of the invention and, accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A carrier for skis and related equipment adapted for use on substantially vertical support surfaces, such as the rear end or side surface of a camper, van or similar recrational vehicle, comprising:

complimentary upper and lower carriers for racking and clamping skis and ski poles vertically, means mounting the upper and lower carriers to upper and lower areas of the support surfaces, respectively, including (1) extensible and retractable members connected to the upper and lower carriers, and (2) means secured to the support surfaces mounting the extensible and retractable members and carriers connected thereto for vertical movement, wherein the upper carrier includes a pair of spaced, parallel, co-planer end members interconnected medially by a co-planer brace and a clamping area extending parallel to the brace for clamping skis in place between the brace and the arm, one end of the arm pivotally mounted to the other terminal end of one end member and the other end of the arm having key lockable retaining means connecting the other end of the arm to the outer terminal end of the other end member.

2. The carrier of claim 1 wherein the brace includes paired guides extending from the outer surface thereof between the brace and the arm for holding and supporting paired skis.

3. The system of claim 1 wherein the lower carrier includes a pair of spaced, parallel, co-planar end members interconnected by a horizontally oriented planar shelf against which the ends of the skis by the upper carrier rest, a ski support including spaced-apart, parallel braces interconnecting the end members above the shelf and in alignment therewith, the braces having paired cross-bars extending therebetween at spaced intervals between which the lower end portions of the paired skis are nested and capacitively held.

4. The carrier of claim 1 wherein projecting, T-shaped ski pole holders are secured at the base of the T to the inner side of the brace and resilient pads are secured to the brace beneath each arm of the T, the pads in conjunction with the arm of the T holding a pair of ski poles in position.

5. A carrier for skis and ski poles adapted for use on substantially vertical support surfaces, such as the rear end or side surfaces of a camper, van or similar recreational vehicle, comprising:

an upper ski and ski pole racking, clamping and suspending section, including (1) base plates adapted to be secured in a fixed position on a selected support surface, (2) lugs extending outwardly from each of the base plates, (3) paired bracket means having ears hingedly and detachably joined to the lugs on said base plates for vertical movement, (4)

elongated channel members secured to each of the brackets, (5) a pair of spaced, parallel, co-planar end members interconnected medially by a co-planar brace, the inwardly directed ends of the end members adapted to be telescoped and adjustably held in the respective channel members, (6) a clamping arm having one end pivotally mounted to the outer end of one end member and the other end lockably connectable to the outer end of the other end member, the arm extending parallel with the brace for clamping pairs of skis between the brace and the arm, the inner surface of the arm covered with a strip of compressible, resilient material and the opposed outer cooperating side of the brace having laterally spaced ski locating and holding guides extending therefrom for supporting pairs of skis, (7) projecting, T-shaped ski pole holders secured to the inner lengthwise side of the brace, compressibly resilient pads secured to the inner length of the brace beneath the arms of each T-holder so that the combination of pad and legs of the T cooperate in holding a pair of ski poles in position; and a lower carrier beneath and adjustably bracketed to a lower area of the supporting surface in alignment with the upper carrier.

6. The carrier of claim 5 wherein the lower carrier is hingedly mounted for vertical movement and includes a pair of spaced, parallel, co-planar end members interconnected by a horizontally oriented planar shelf against which the ends of the skis are supported by the upper carrier rest, a ski support spaced above the shelf and in alignment therewith including spaced-apart parallel braces interconnecting the end members with paired cross-bars extending therebetween at spaced intervals between which the lower end portions of the paired skis are nested and captively held.

* * * * *